United States Patent [19]

Galmiche et al.

[11] 4,096,296

[45] Jun. 20, 1978

[54] PROCESS FOR FORMING SURFACE DIFFUSION ALLOY LAYERS ON REFRACTORY METALLIC ARTICLES

[75] Inventors: Philippe M. Galmiche, Clamart; André R. Hivert, Pontoise; André M. Walder, L'Hay-les-Roses, all of France

[73] Assignee: Office National d'Etudes et de Recherches Aerospatiales, France

[21] Appl. No.: 664,392

[22] Filed: Mar. 5, 1976

[30] Foreign Application Priority Data

Mar. 7, 1975 France ............................... 75 07238
Aug. 8, 1975 France ............................... 75 24846

[51] Int. Cl.$^2$ .............................................. C23C 9/02
[52] U.S. Cl. ................................ 427/247; 29/156.8 B; 148/6.3; 427/250; 427/252; 427/253; 427/300; 427/401
[58] Field of Search .................. 148/6.3; 427/247, 250, 427/252, 253; 29/156.8 B, 156.8 H

[56] References Cited

U.S. PATENT DOCUMENTS

| 2,656,283 | 10/1953 | Fink et al. .......................... 427/253 X |
| 2,921,877 | 1/1960 | Samuel et al. ..................... 427/250 X |
| 3,585,068 | 6/1971 | Holker et al. ......................... 427/253 |

FOREIGN PATENT DOCUMENTS 827,132  2/1960  United Kingdom ................ 427/252

Primary Examiner—Harry J. Gwinnell
Attorney, Agent, or Firm—Larson, Taylor and Hinds

[57] ABSTRACT

A metal article having perforations therein whose transverse cross-sectional dimension is less than 0.4 mm has formed thereon a surface diffusion alloy by applying a refractory filter element to the workpiece surface prior to the diffusion treatment, the filter element being a refractory felt based on metal fibres including chromium in a proportion by weight of from 10 to 60%. The felt is oxidized to give a layer of chromium oxide. This is followed by conventional thermochemical powder diffusion treatment in the presence of at least one chromium oxide-reducing element selected from aluminium, yttrium, titanium and the lanthanides.

14 Claims, 4 Drawing Figures

PROCESS FOR FORMING SURFACE DIFFUSION ALLOY LAYERS ON REFRACTORY METALLIC ARTICLES

The invention relates first of all to processes for forming on metal articles or workpieces surface diffusion alloys using one or two addition metals. The surface diffusion alloy layer formed by such processes comprising, in the commonest case, a protective layer for improving the ability of the treated workpieces to withstand corrosion, particularly in hot oxidizing or oxido-reducing or sulphurated atmospheres, and to withstand thermal shocks (alternate heating and cooling), the addition metals which are of use for forming such a protective layer being mainly chromium, aluminium and even silicon and titanium.

In a further example, the surface diffusion alloy layer comprises a diffusion barrier enabling the subsequent formation on the treated workpieces of a protective layer which is isolated from the parent material of the workpiece by the diffusion barrier, the same thus preventing any impairment by migration of metals of the protective layer, the addition metals which are of use for the formation of such a diffusion barrier being mainly tantalum and yttrium.

Although the processes according to the invention can be used with any metal workpiece, whether made of a pure metal or of an alloy, the processes relate more particularly to the treatment of refractory metal articles, more particularly those which in operation experience the combustion gases produced in internal combustion engines, as is the case inter alia with the fixed and moving blades of gas turbines and, more particularly, the first stages of the hot turbines of turbo-jet engines.

Refractory metal articles for which the processes according to the invention may have advantages include articles made throughout, or on their surface, or surfaces of an alloy based on iron, nickel, cobalt, tungsten, molybdenum or a number of such metals, the complete system of the alloy ingredients being such as regards both the nature of the ingredients and their relative proportions that, before being given any surface protection treatment, the articles concerned have a good creep strength and some ability to withstand hot corrosion.

A high creep strength produced by additions of titanium, aluminium, tantalum and so on means that the article concerned has a relatively low chromium content and therefore a relatively low resistance to hot corrosion, hence the need for giving such articles a surface treatment strengthening their hot corrosion resistance.

The magnitude of the problem can be realized in connection with turbo-jet engines, for the performances thereof increase in proportion as the turbine inlet temperature increases to make it possible to exceed turbine inlet temperatures of the order of 1000° C and to operate at local temperatures of the order of 1300° C or even higher, it has become necessary to cool the turbine fixed and moving blades internally by air flows therethrough, the air being removed through rows of apertures in the leading and trailing edges of the blades or in the top and/or bottom blade surfaces, the apertures being present in as large a number as possible and being as narrow as possible.

The invention also relates to special systems devised to carry the processes according to the invention into effect, including filter elements which will be dealt with in greater detail hereinafter in connection with the most general definition of the processes according to the invention.

The invention also relates to metal articles treated by the processes according to the invention and by means of the special systems referred to, more particularly amongst such metal workpieces to refractory metal workpieces for internal combustion engines, including the fixed and moving blades of the first stages of turbo-jet turbines, and more particularly, hollow and/or perforate articles of this kind.

The closest prior art is embodied by a category of processes in which workpieces or articles for treatment are embedded in a reactive composition containing at least one metal powder or alloy powder supplying the or each addition metal to be incorporated in the surface layers of the workpieces, plus a chemically inert diluent which is also in powder form. The diffusion treatment in such cases is a heat treatment which heats to a temperature of from 750° to 1200° C the complete system embodied by the reactive composition and the workpieces embedded therein, the heat treatment being carried out in a halogenated atmosphere which can be produced by including in the reactive composition at least one hot-volatile (or hydrogen-reducible) halogen (or halogen compound) which after vaporization or reduction serves as a gas vehicle for transferring the or each addition metal from the reactive composition as far as the surface layers of the workpieces.

The processes in this category are familiar to skilled addressees in the art and are called "powder processes" or "contact processes" or in US terminology "pack-processes". As examples of patents on pack-processes, there is French Pat. No. 1,433,672 of the American company CHROMALLOY CORPORATION and there is the French patent No. 2,094,258 of 4 Feb. 1972, the latter patent being assigned to the same assignee as the present invention and relating to a pack process for magnesium chrome aluminization of metal and inter alia refractory articles.

Without entering into a detailed analysis here of the different known pack processes, it will be sufficient to say that they all have one characteristic in common, viz. direct contact between the reactive mixture and the articles to be treated. Direct contact has some advantages and can inter alia provide even and relatively thick diffusion layers on the treated articles.

However, conventional pack processes have disadvantages arising precisely from the direct contacting of the reactive mixture with the workpieces embedded therein during the diffusion heat treatment. The disadvantages include:

the unsatisfactory surface texture of the articles at the end of the diffusion heat treatment; this defect, which is caused by slight surface inclusions of pieces of particles from the reactive composition, means that for some purposes an additional finishing treatment must be given to make the surface completely smooth;

the fact that the diffusion alloy layer has a constant thickness over the whole of the surface of the treated articles, something which is not always wanted, as is the case of articles having some parts exposed more than others to corrosive actions (the only way of making the thickness other than constant is to use complex furnaces having differentiated temperature zones; even then only articles of simple shapes can be dealt with), and the impossibility in practice of treating hollow articles whose wall is pierced throughout with narrow apertures (< 0.4 mm diameter) for a gas flow (as is the case, described above, with some fixed and moving blades of turbines), since such apertures, whose diameter is usually of the order of from 0.2 to 0.3 mm, tend to become blocked rapidly during diffusion heat treatment by particles from the reactive composition, the grain size of such particles usually being from 1 to 50 microns.

Clearly, the latter disadvantage prevents any further advance at present in the advanced technology of perforate hollow fixed and moving blades, an area in which all the experts are endeavouring to increase corrosion and thermal shock resistance so as to make it possible to increase the turbine inlet temperatures of turbo-jet engines and thus increase their power.

Every endeavour made so far by experts to obviate the latter disadvantage has failed. For instance, the treatment of hollow perforate blades by vapour phase thermochemical processes in which the reactive composition is not in contact with the articles being treated has been proved unsatisfactory, first because the resulting diffusion layer is not thick enough on the workpiece surfaces and a fortiori in the apertures extending through the workpiece walls, and second because the gas flow between the reactive composition and the workpieces carries with it particles which may block the apertures. This is the case more particularly with processes of the kind disclosed by U.S. Pat. No. 2,921,877 wherein a lattice-like screen is interposed between the article to be treated and the reactive composition; of course, fine particles of the reactive composition which are vehicled by the gas flow can flow freely through the meshes of the lattice.

Physical processes such as sputtering or ion plating can provide a thick protective layer on the surface of articles but are completely inoperative inside the apertures.

Piercing apertures in such workpieces after the same have been treated by a pack or some other process has also proved unsatisfactory, for the hole inner wall is unprotected in such cases, and so, amongst other disadvantages, hole diameter decreases rapidly because of encrusting of the unprotected wall, and the holes may become totally blocked by deposits of carbon and/or of salts which stick much more readily to an unprotected wall than to a protected wall.

The inventors here, since they are also experts in metal fibre materials which have filtering properties and which can withstand corrosion by hot oxidation, considered that if the present difficulties just referred to could be obviated by some form of filtering, the general features of pack processes could be retained, including simplicity, cheapness and the considerable thickness of the diffusion alloy layer formed on the treated articles.

The remedy should therefore lie in providing at least local protection of the treated articles against any action by or transfer of solid particles, even of a very reduced grain size of the order e.g. of 1 micron, from the reactive composition, such protection being provided by covering at least some portions of the surface of the articles to be treated with a filter layer of a refractory porous material through which the active vapours of the reactive composition can reach the workpieces freely but which inhibit any transfer of solid particles from such composition to such workpieces.

Theoretically at least, such an approach to the problem should of course help to avoid the three major disadvantages hereinbefore referred to of conventional pack processes, for the refractory filter layer can withstand diffusion treatment temperatures, allows the active vapours to pass and, by preventing any transfer of solid particles away from the reactive composition, should ensure that the treated workpieces have a smooth and lustrous surface texture and also, in the case of perforate articles, prevent holes in the workpieces from being blocked. Also, by controlling local porosity by controlled squeezing of the filter layer, it should be possible to provide local variations in the permeability of the filter layer to the active vapours from the reactive composition, in which event the thickness of the diffusion layers formed on the treated articles could be "modulated".

Also, since the filter layers are in any case thin and the active vapours can pass through their pores freely, it should be possible to retain all the advantages of pack processes resulting from the fact that the reactive composition and the workpieces are very close together.

At this stage of their research for a solution of the problem which would retain pack process features but which would protect at least some portions of the workpieces by means of refractory filter layers forming a complete barrier to the powder particles, however fine, forming the reactive composition, the inventors realized that they would have to make a systematic study of the features which such filter layers should have for the proposed solution to be viable industrially.

This systematic study showed that a filter layer which could act as a barrier in thermochemical diffusion treatment to solid particles but allow the active vapours to pass freely would have to comply with all of the following technical criteria:

(a) complete sealing-tightness in both static and dynamic (impacts and vibrations) conditions to the very fine solid particles forming the reactive composition (grain size of from 1 to 50 microns);

(b) very high plasticity so that the filter layer can engage intimately with the workpiece outer surface and thus maintain the reactive composition at a short distance therefrom (such distance corresponding to the reduced thickness of the thin filter layer);

(c) good mechanical continuity preventing any cracking or scaling in the application of the filter layer to the workpiece outside surface, so as to ensure that solid particles cannot become detached from the filter layer and impair the workpiece outside surface, e.g. by forming inclusions or, in the case of a perforate article, blocking the apertures therein;

(d) high porosity, providing a free flow for active vapours from the reactive composition to the workpiece outer surface;

(e) thermochemical inertness to the workpiece outside surface;

(f) low consumption of the donor elements contained in the reactive composition and to be transferred to the surface layers of the treated article (one or more addition metals), and (g) absence of all sticking by intermetallic diffusion to points of contact with the outside surface of the treated workpiece, since any sticking point or zone would result, when the filter layer was removed, in an impairment of the article surface and possibly even in the blockage of apertures in a perforate workpiece.

Having made this systematic study of the criteria to be met by the filter layer and having compared the various most elaborate filter materials, including inter alia carbon cloths or felts, metal cloths and ceramic felts, with the list of criteria, the it was found that no existing material meets all of the criteria (a) to (g) and that research should continue to discover a filter material which, if given certain conversions or transformations, could meet all of criteria (a) to (g).

The inventors have accordingly been led to select, as a starting filter material requiring further conversion or transformation treatments, a metal fibre material which the developed for other purposes and which has high plasticity, high porosity and a satisfactory resistance to hot corrosion in a hydrogenated-halogenated atmosphere, such material, which is known as, and will be referred to hereinafter as, "ONERA felt", being described in detail as regards has been process for preparing it and as regards its technical features and possible uses, in the commonly assigned French Pat. No. 2,058,732 of 28 May 1971.

Since this generally accessible publication exists, all that will be done here is to recall the main features of ONERA felt, the features being closely linked with the process for its preparation.

The process comprises first preparing a carbon skeleton which has been made to be a very good electrical conductor and which has the general texture of the required product (felt), whereafter, and as a rule electrolytically, a low-electropositive metal or alloy (maximum electropositivity of 0.7) is deposited on the skeleton. The resulting product is a flock-like substance which is dispersed in a liquid and which is collected by sedimentation by a conventional paper-making technique, thereafter the product is sintered with simultaneous elimination of the highly conductive carbon skeleton, the end product being a felt consisting solely of the deposited metal or alloy, the same being in the form of narrow tubular fibres.

The inventors then compared a whole series of ONERA fibres (prepared in accordance with the provisions of French Pat. No. 2,058,732) with the seven obligatory criteria (a) to (g) for the filter layers being developed by the inventors. The comparison showed that the ONERA felts, except that they are relatively thin, met five of the seven criteria but failed to meet the other two. The criteria satisfied are the following:

(a) sealing-tightness to fine solid particles — satisfied because of the fibrous texture of the thin ONERA felts which consist of entangled fibres of from 10 to 20 microns in diameter inhibiting any migration of fine solids, even in the case of felts which are actually very thin — from 0.3 to 1 mm thick;

(b) plasticity — completely satisfied, since the thin ONERA felts are completely plastic and free from all springiness, so that they can be made to follow complex surfaces intimately and have no tendency to disengage locally therefrom as a result of internal elastic stresses;

(c) good mechanical continuity — completely satisfied, since the thin ONERA felts do not suffer from any local disintegration even when deformed by accentuated bending;

(d) porosity — fully satisfied, since the thin ONERA felts have a total porosity which can be as much as from 90 to 95%, so that the active vapours can flow freely (better than in the reactive compositions used in pack processes, since the porosity of such compositions is of the order of 50%), and (f) low consumption of donor elements of the reactive composition — good level of satisfaction, since the high porosity of thin ONERA felts and the fact that they have tubular fibres result in a low weight/$cm^2$ of area covered and therefore in a virtually negligible consumption of the donor elements.

The criteria which the thin ONERA felts prepared in accordance with French Pat. No. 2,058,732 failed to satisfy are the following:

(e) thermo-chemical inertness to the surface of the treated workpieces — the reason for the unsatisfactory behaviour of the felts is that they have a marked tendency to cause migration of some metals usually present in the articles, such metals then being retained by the felts to the detriment of the qualitative and quantitative composition of the surface layers of the workpieces, and (g) no sticking to workpieces — the reason for this drawback of the felts is intermetallic diffusion phenomena occurring between the contacting surfaces of the felt and of the workpieces during the thermochemical diffusion treatment, the phenomena causing anchorage spots and zones between the felt and the workpiece.

At this stage of research and in the light of the unsatisfactory behaviour of ONERA felts as regards points (e) and (g), the Applicants studied the problem of what sort of processing could be given ONERA felts to improve their behaviour as regards points (e) and (g) and also to enable them to satisfy all points (a) to (g) in the manner necessary for the filter layers according to the invention if they are to be effective in thermochemical diffusion treatment.

The objects and main features of the invention will now be described with reference to the foregoing introduction about the consecutive stages and conditions which led to the origination and industrial development of the invention; the introduction is intended to include only concepts which are essential for a proper understanding of the invention. Briefly, the aims of the introduction are:

to give an accurate definition of the possible uses of the invention;

to recall the prior art in the uses thus defined, with particulars of the disadvantages of the prior art solutions and with the deadlocks confronting research into some particularly delicate advanced technology problems in connection with the protection of turbine elements, particularly hollow perforate moving and fixed blades, so as to make it possible to increase turbine inlet temperatures;

to devise a concise and accurate terminology for concepts which will be used hereinafter to describe the main features of the invention, thus greatly facilitating and shortening the description without any loss of clarity and technical accuracy, and more particularly to show that the inventors, although specializing in protection treatments for metal articles exposed to hot corrosion and in plastic refractory filter materials, had to undertake a whole range of extensive and varied research operations (choice of filtering solution in a pack process, determining a series of essential criteria for a filter material to be invented, choosing a refractory plastic filter material needing minimum conversion or transformation steps in order to meet the criteria, devising processing for the material so that it satisfies requirements), all of these operations calling for a strict scientific attitude in research and an inventiveness which the foregoing introduction shows up clearly, at least in outline.

In the light of the foregoing, the main object of the invention is to provide a process for forming surface diffusion alloys on metal, e.g. refractory, articles, the process having the same advantages as conventional pack processes but not having the disadvantages thereof.

Another object of the invention is to provide a refractory filter material for carrying the process into effect.

Another object of the invention is to provide filter layers made of such filter material and adapted to the shape of the articles or workpieces.

Another object of the invention is to make it possible to prepare metal, e.g. refractory, articles having surface diffusion layers of appreciable thickness of the same order as can be provided by conventional pack processes, a smooth lustrous surface appearance and, more particularly in the case of pierced workpieces, completely clear apertures whose walls have also received surface diffusion layers.

The process according to the invention relates to the formation of surface diffusion alloys on metal articles, including refractory metal articles which in operation experience hot corrosive gases and, more particularly on articles of such a kind which are perforate, particularly hollow turbine blades, the process being characterized by the following features:

the articles or workpieces to be treated are covered over at least some of their outside surface by refractory filter elements of a kind to be described hereinafter and shaped to make intimate contact with the corresponding workpiece surfaces;

the filter elements take the form of a thin sheet of a refractory felt based on metal and preferably tubular fibres, the felt from which the filter elements are made having previously been treated so as to include, in the form of an alloy with the or each, constituent metal of the felt, chromium in a proportion by weight, referred to the felt, of from 10 to 60%, preferably 25 to 50%, whereafter the chromium-containing felt is given selective oxidation to produce at the surface of the metal fibres embodying the felt a layer of chromium oxide, $Cr_2O_3$, generally representing at least 5% of the weight of the felt, and the workpieces, having on at least some of their outside surface filter elements in the form of a refractory metal fibre felt which has previously been treated as hereinbefore described, are given a conventional thermochemical powder diffusion treatment in a hydrogenated-halogenated atmosphere during which the workpieces are immersed and heated in a reactive composition containing the or each addition metal to be added, in the form of diffusion alloys, in the surface layers of the treated workpieces, in the presence of a chromium oxide reducing element belonging to the group consisting of aluminium, yttrium, titanium and the lanthanides, the metals of such group having the property of producing at the start of the diffusion treatment halide vapours of the metals, such vapours reacting with the chromium oxide layer sheathing the metal fibres embodying the elements of the pre-treated refractory felt, the reaction converting the chromium oxide layer into a chemically inert and stable protective film of the or each oxide of the or each metal.

The reducing element concerned can be prepared by the presence of at least one of such metals in the reactive composition and/or it can be added in the form of a layer disposed at least on the surface of the filter elements in contact with the workpieces, e.g. by means of a pomade or paint or thin foil or by a vacuum coating treatment of the metal concerned.

Preferably, the refractory metal fibre felt in thin sheet form which has been given the preliminary treatment hereinbefore described in connection with the definition of a process according to the invention is of the tubular metal fibre kind defined in French Pat. No. 2,058,732.

These main features according to the invention definitely make it possible to achieve the object of the invention — i.e., to comply with criteria (e) and (g), since:

the presence of chromium in a considerable quantity effectively ensures that during the diffusion treatment there is no considerable migration of metals from the substrate of the workpieces being treated to the felt elements applied to the workpieces, and the stable inert film of oxide or oxides prevents any sticking during the diffusion treatment between the spots or zones by way of which the felt elements contact the workpieces.

Chromium oxide is stable enough to run no risk of being reduced by atmospheric hydrogen at the start of the diffusion treatment; however, chromium oxide can be reduced by metals of the group hereinbefore mentioned to be converted into a stable inert oxide.

The articles prepared by the process according to the invention are free from any inclusion and have a smooth lustrous surface texture comparable with the surface texture of articles which have been treated by gas-phase processes; however, the diffusion layer thicknesses of the workpieces which have been treated in accordance with the invention can be as much as 100 microns or more and are independent of workpiece shape.

Also and very importantly, the apertures in hollow perforate articles, more particularly turbine blades, remain completely homothetic and clear and their walls have a diffusion layer of substantially the same thickness as the external diffusion layers, the internal wall of the hollow article also receiving a diffusion coating since such wall is reached by the active vapours through the apertures or passages, the same remaining clear throughout the thermochemical treatment.

If the walls of the apertures are required to have a diffusion layer which is appreciably thinner than the layers of the external surfaces, the imperforate article is first treated to provide the protective layer on its external surfaces, the treatment being either thermochemical or physical, whereafter the articles are pierced and treated by the process according to the invention.

A description will now be given of some further features of the invention in connection with preferred but non-limitative embodiments of the process according to the invention.

A first further or supplementary feature concerns workpieces containing at least in their surface layers, and as well as chromium, where applicable, other metals having a strong tendency to migrate from the surface layers to the felt elements applied to the workpieces during the thermochemical diffusion treatment, metals which have such a tendency being in practice those of the group consisting of aluminium, yttrium, titanium, lanthanides and tantalum and even iron and cobalt.

Although the presence of a considerable quantity of chromium in the felt elements helps, as just stated, to inhibit the transfer of migratory metals from the substrate to the felt, the inhibiting effect may be inadequate in the case of workpieces containing an appreciable proportion, e.g. more than 5%, at least in the surface layers of one or more of the metals having a strong migratory tendency, particularly aluminium, yttrium, titanium, lanthanides and tantalum. In such a case it may be advantageous to use the first supplementary feature according to the invention, such feature being that as well as chromium (a metal whose previous inclusion is essential, as stated in the main discussion of the invention), one or more migratory metals of the group consisting of aluminium, yttrium, titanium, lanthanides, tantalum, iron and cobalt, present in an appreciable proportion in at least the surface layers of the workpieces is previously incorporated as an alloy in the thin felt elements which will subsequently be applied to the workpieces to be treated.

As a simple way of achieving such pre-inclusion of migratory metal in alloy form in a thin felt element, the felt elements are given a preliminary diffusion treatment (separate from the diffusion treatment given subsequently to the workpieces), the preliminary diffusion treatment which is given the felt element preferably being a powder diffusion process using a reactive composition containing the or each migratory metal which it is required to incorporate in alloy form in the felt elements.

The chromium (which must be present in the felt elements) and the or each additional migratory metal (iron, cobalt and tantalum) having an electropositivity near that of chromium can be incorporated in the felt elements simultaneously if the reactive composition used in such powder or pack process is a polyvalent composition containing in addition to chromium the or each additional migratory metal.

If the or each migratory metal has an electropositivity much higher than that of chromium (as is the case with aluminium and titanium), the or each additional migratory metal is incorporated in an additional treatment using an appropriate reactive composition containing such high-electropositive metals.

The felt elements which will subsequently be applied to the workpieces are cut from a thin felt sheet of a thickness preferably of from a few tenths of a millimeter to a few millimeters.

Although it may seem possible to give the original felt sheet the treatments just mentioned first (inclusion of chromium and, where applicable, one or more other migratory metals, followed by selective oxidation) and then cut from the felt sheet thus treated, the felt elements required to be applied to the workpieces for treatment, a different sequence of operations seems preferable since the chromium oxide layer evolved in the selective oxidation treatment cracks relatively readily and might be damaged if the felt elements were cut from a processed felt sheet, such elements having to be deformed subsequently so as to engage intimately with the surfaces of the articles to be treated.

Advantageously, to obviate such a disadvantage a second additional feature of the invention is used wherein:

first, elements of a shape and dimensions such that the elements can, when plastically deformed, engage intimately with at least some and even all of the outside surface of the workpieces to be treated are cut from a sheet of metal felt;

the felt elements thus provided are then fitted to the shape of the corresponding surfaces of the workpieces, e.g. by means of embossing or pressing tools or by direct application of the elements to the surfaces;

the felt elements thus performed are released so that they may be given the required conversion treatments;

The performed felt elements are given the conversion treatments comprising the incorporation in alloy form of chromium — and, where applicable, of one or more other migratory metals — followed by a selective oxidation;

the felt elements thus converted are replaced on the workpieces to be treated and tightly secured thereto;

the workpieces to be treated, thus fitted with their preformed and converted felt elements, are given the powder diffusion thermochemical treatment corresponding to the metal additions which are required for the workpieces, and upon completion of the diffusion treatment the treated workpieces are removed from the reactive composition and their felt elements are removed from them, e.g., simply by being torn off.

A third additional or supplementary feature of the invention relates to a very advantageous embodiment of the working phase, with at least chromium and, where applicable, at least one other migratory metal being incorporated in a metal felt element in the form of an alloy with the metal substance forming the felt fibres, in which third feature:

the felt element is embedded in a reactive composition consisting of a mixture, in approximately equal proportions by weight, of inert diluent powder and of fine powder (of a grain size of the order of from 1 to 20 microns) of chromium or of nickel-chromium alloy and of one or more additional migratory metals having an electropositivity near that of chromium, such as cobalt or iron or tantalum;

the whole is heated in a hydrogenated-halogenated atmosphere at a temperature of from 800° to 1200° C for 20 hours ± half an hour, and the felt element thus treated is removed from the reactivity composition, then washed in dilute nitric acid and then, with advantage, rinsed in distilled water. The preferred inert diluent is magnesia (MgO), but alumina ($Al_2O_3$) can also be used. If alumina is used, the surfaces of the felt element are, with advantage, coated with a layer of magnesia.

In a variant of the third feature, for incorporating very high-electropositive migratory metals in a metal felt element already containing chromium, the following technique is employed:

the felt element is embedded in a reactive composition containing in addition to the inert diluent a fine powder, of a grain size of the order of from 1 to 20 microns, of the or each additional metal, and the whole is heated in a hydrogenated-halogenated atmosphere.

The resulting felt elements have completely clean surfaces, a plasticity which has suffered negligibly relatively to the plasticity of the starting felt, and an overall porosity which is only slightly less (because of the addition of chromium and of other metals) than the porosity of the starting felt, the total porosity of the treated felt possibly being as much as from 84 to 90% as compared with a total porosity of the starting felt of the order of from 92 to 94%.

A fourth additional feature of the invention relates to the shape to be given the metal felt elements during the pre-shaping phase, such feature comprising pre-shaping the felt elements:

either as simple "pellets" (when it is required to isolate merely a limited local zone of the workpiece from the reactive composition), or, more generally, in the form of a sheath providing at least partial and preferably total sheathing of the treated workpiece, the sheath preferably being embodied by two individually preformed half-shells which are juxtaposed on the workpiece with their adjacent edges rigidly interconnected, e.g., by the formation of a bead, such edges being devised to overlap from the workpiece contour so as to facilitate such interconnection.

This method of providing the workpieces with a felt sheet is particularly recommended when the workpieces are fixed or moving turbine blades, particularly hollow perforate blades.

A fifth supplementary feature of the invention, which feature relates to the pre-shaped and treated metal felt elements ready for application to the workpieces, uses the porosity and plastic deformability features of such elements. As seen in the foregoing, in the process according to the invention the vapours from the reactive composition pass through the felt elements to vehicle one or more additional metals to the surface layers of the workpieces, the flow of active vapours being unobstructed because of the considerable porosity of the felt elements. Clearly, if porosity is reduced, the flow of active vapours slows down, and so the resulting diffusion layers on the workpieces are thinner.

The pre-shaped and processed felt elements hereinbefore referred to are prepared from a thin sheet of metal felt of constant thickness, the felt elements, which are also of constant thickness, being responsible for producing on the workpieces uniform diffusion layers of identical thickness throughout.

In some cases it may be useful if the workpieces can be provided with diffusion layers of varying thickness, inter alia diffusion layers which are thicker in those regions of the articles or workpieces which are most exposed to corrosion when the workpieces are in operation.

To this end, and according to the fifth supplementary feature of the invention, to vary the thickness of the diffusion layers, the metal felt element is given during shaping local compressions or squeezings (by plastic deformation) of varying intensities, whereafter the various zones of the felt element are less porous in proportion as they have been more compressed or squeezed, so that upon completion of thermochemical diffusion treatment of the workpiece, the thickness of the diffusion layers formed on the workpiece is in inverse proportion to the amount of squeezing of the oppositely disposed zone of the corresponding felt element.

Clearly, by means of the fifth feature a particular workpiece can be given, in accordance with local vulnerability of the various workpiece zones, a real modulation or variation (in accordance with a predetermined pattern) of diffusion layer thickness in a manner which, with conventional pack processes, is either virtually impossible or which at the very most can be achieved only by using for the diffusion treatment a complex and differentiated heating system adapted to provide more intense heating of the workpiece zones required to have relatively thick diffusion layers.

A sixth supplementary feature according to the invention relates to a preferred form of the selective oxidation treatment of a refractorized metal felt element which has already received an addition of chromium in alloy form and possibly at least one other migratory metal, wherein to selectively oxidize the felt element the same is heated in a wet hydrogen atmosphere at a temperature of from 700° to 900° C for a time of from a few hours to a few minutes, the wet hydrogen atmosphere being produced, with advantage, by flowing hydrogen being bubbled through water at approximately 30° C. The selectively oxidized felt element experiences a weight increase of the order of 2.5% corresponding to a weight content of chromium oxide of the order of 8%.

This form of selective oxidation step does not impair the inner ductility of the treated felt element; however, the resulting chromium oxide layer cracks relatively readily, hence the advantage of performing this step after shaping of the felt element, as previously stated.

A seventh supplementary feature of the invention relates more particularly to the treatment of perforate hollow articles in which apertures of a predetermined diameter are required after treatment, wherein the process according to the invention is used after such apertures have been overdimensioned in a proportion such that, after the diffusion layer has been formed in the wall of each aperture (such formation producing an overthickness), the aperture diameter is in fact of the required value. A diffusion layer of the order of 100 microns produces an overthickness of the order of 50 microns, and so if the apertures or passages are to have a predetermined aftertreatment end diameter, the apertures must be pierced initially so that the diameter is 100 microns more than their end diameter, thus greatly facilitating the piercing or drilling step. This step is increasingly more delicate as the holes are narrower, due to the fragility of narrow-diameter drilling or piercing tools. The seventh feature is therefore of particular interest for treating hollow perforate blades.

An eighth supplementary feature of the invention relates to the case hereinbefore referred to in which the required end product is a perforate article in which the aperture walls have a diffusion layer appreciably thinner than the diffusion layers produced on the article external wall. According to the eighth feature, before the piercing of the apertures the articles is given thermochemical or physical treatment to produce a diffusion layer on the workpiece external wall, whereafter the same is pierced and then given the treatment according to the invention.

Before dealing with the ninth supplementary feature of the invention and to give a clear delineation of the uses of such feature, it should be recalled that in the general scheme of pack processes of interest so far, a distinction is drawn between:

moderate-activity pack processes performed in a single step and using a diffusion heat treatment given at a high temperature of from 1000° to 1150° C for a prolonged period of from 10 to 15 hours, and high-activity pack processes performed in two consecutive steps and using first a thermal addition process (concerning articles embedded in the reactive composition) at a relatively low temperature of from 750° to 850° C for a relatively short period of from a few minutes to 1 hour, followed by a post-diffusion treatment at a high temperature of above 1000° C in an inert or reducing atmosphere and after removal of the workpieces from the reactive composition, the final post-diffusion treatment serving to increase the thickness of the diffusion alloy layer and to reduce the fragility thereof upon completion of the initial addition treatment.

The main feature of the invention and the eight supplementary features hereinbefore described relate in general to all pack processes, including both moderate-activity and high-activity pack processes, as is apparent from the specified temperature range of from 750° to 1200° C in connection with the discussion of the main feature of the invention. However, the ninth supplementary feature of the invention is of use only for high-activity pack processes and is applied to the addition heat treatment (at a relatively low temperature and for a relatively short time) forming the initial phase of high-activity pack processes.

The Applicants have found in this conection that when it is required to use the main feature of the invention for hollow articles, inter alia perforate hollow articles, to be given high-activity pack processing, a difficulty arises which will be described hereinafter and which is the result precisely of the relatively low temperature and of the relatively brief duration of high-activity treatments, for these treatment conditions make it possible to readily control the results (and thus to have the necessary reliability) of results so far as thickness and regularity of the diffusion layers formed on the internal walls of the treated hollow articles are concerned. The reason is that the low temperatures and short treatment times make it impossible to provide to an adequate extent the gas diffusion motions which are essential to produce the flow of the halogenated vapours vehicling the or each addition metal.

It is precisely the object of the ninth supplementary feature of the invention to obviate such a disadvantage — i.e., to provide a process in which high-activity pack processing of hollow metal articles can produce thick and even diffusion layers on the internal wall of such articles even though the hollow interior of the articles has a complex shape.

Another object of the ninth supplementary feature of the invention is to provide special means which are adapted to supply the or each addition metal and which are consumed entirely in the thermochemical diffusion treatment.

Another object of the ninth supplementary feature is to provide hollow and inter alia metal articles whose internal wall is provided, subsequent to a high-activity pack-process treatment, with thick and even diffusion layers.

According to the ninth supplementary feature of the invention, the process (discussed above as) forming the subject matter of the main feature of the invention and, where applicable, of at least one of the supplementary features is applied to such metal articles made of a refractory alloy, provided that the reaction composition used in the thermochemical diffusion treatment contains aluminium and that such treatment is the initial step of a high-activity pack process — i.e., is performed at a relatively low temperature of from 750 ° to 850° C and for a relatively short time of from a few minutes to 1 hour — the process according to the ninth supplementary feature of the invention being distinguished in that the inner space of the workpieces to be treated has placed in it — before the workpieces are given the brief low-temperature thermochemical powder treatment — a predetermined quantity of metal addition elements comprising an aluminium core embedded in a sheath consisting of at least one refractory metal adapted to be deposited readily electrolytically or physically or chemically on the aluminium core and adapted to form a diffusion alloy with the metal of which the treated workpiece consists, this predetermined quantity of metal addition elements being such that such elements are completely consumed upon the completion of the thermochemical powder treatment. It therefore becomes possible to provide on the inner walls of hollow articles treated by a high-activity pack diffusion process aluminium-containing diffusion layers of a predetermined and even thickness. Also, since the filter elements according to the main feature of the invention are used simultaneously with the step just described, there is no impairment of the surface texture of the workpieces and, in the case of perforate workpieces, no risk of obstruction of narrow passages.

Preferably chromium, but possibly iron or manganese, is the refractory metal used to sheath the metal addition elements (the main function of such refractory metal being to maintain the aluminium core of the addition elements temporarily throughout the treatment time).

Preferably, the shapes and dimensions of the metal addition elements which must be placed in the workpieces and which have been consumed upon the completion of treatment without leaving any measurable solid or powdery trace are so determined as to be elongated and thin so that their reactive area is high enough for them to be transported in their entirety to the inside surface of the workpieces at the relatively low temperatures and short treatment times associated with high-activity powder-diffusion treatments. Also, metal addition elements thus shaped give rise to no drops likely to cause local corrosion of the surfaces being treated or of local zones which have too high an aluminium content and which may peel in the operating conditions of the treated workpieces, inter alia in the case of turbine blading.

In the light of the general requirements, thin metal addition elements of the kind described can, with advantage, be embodied:

either as flat strips prepared from aluminium foil less than 200, and preferably 100, microns thick, or aluminium wire braids in which each wire has a diameter of less than 600, preferably less than 300, microns, or fine metal filter-like cloths devised from aluminium wires whose diameter is less than 600, preferably less than 300, microns.

The coating of refractory metal, as a rule chromium, for sheathing the aluminium core of the metal addition elements is of very reduced thickness — 10 microns maximum and preferably less than 3 microns (advantageously of the order of 1 micron) — whatever the core structure (inter alia flat strip or braid or metal cloth), thicknesses of such an order being sufficient to maintain the aluminium core in its initial geometry with a large reactive area despite the low-melting point of aluminium (658° C). The Al/Cr weight ratio is at least 5 and preferably between 7 and 8.

The refractory sheathing metal, as a rule chromium, is deposited on the thin addition metal elements after the aluminium core (inter alia in strip or braid or metal cloth form) has been shaped, it being possible for the refractory metal to be deposited either electrolytically or physically or chemically.

The refractory metal, particularly in the case of chromium, continues to provide advantages after transfer to the workpiece inner wall by considerably improving the ductility and corrosion resistance qualities of the diffusion layers as compared to what would be the case if the latter layers had been formed just by an addition of aluminium. Of course, aluminium and the refractory metal are transferred to the inner wall of the hollow workpiece from the thin metal addition elements solely in a halogenated gas phase, since the halo-hydrogenated vapours evolved by the reactive composition in which the hollow article is embedded enter the same by its open ends and, where applicable, by perforations or the like in the workpiece, the penetration being by way of filter elements masking at least some of the open ends and apertures so that no solid particle may be transferred from the reactive composition to the inside of the workpiece.

As an advantageous way of accelerating this transfer reaction, a small quantity of a halide which is volatile at the treatment temperatures and which is preferably a chloride or a bromide, e.g. ammonium, can be disposed inside the hollow workpieces treated.

In any case, the thickness of the diffusion layers produced on the workpiece inner wall depends upon the quantity of the thin addition elements disposed in the interior of the workpieces, the only rule governing such quantity being that the same must be less than the saturation threshold of the absorption capacity of the workpiece inner wall. Consequently, by appropriate control of such quantity in the margin below the threshold the thickness of the resulting diffusion layer can be adjusted and, inter alia, diffusion layers can be produced which are thinner than the diffusion layers produced on the workpiece outer walls, the latter being usually more exposed to corrosion and oxidation than the inside of the workpieces when the same are in use.

Hollow workpieces treated in accordance with the ninth supplementary feature during the initial step of a high-activity pack process are subsequently removed from the reactive composition have their filter elements removed from them and are given a final post-diffusion treatment, which is conventional for high-activity pack processes, at elevated temperature and in an inert or reducing atmosphere.

The special systems according to the invention — i.e., the special systems for carrying out the process according to the invention as defined by the main feature of the invention and the nine supplementary features hereinbefore set forth - are the following:

a thin metal felt sheet, preferably containing tubular fibres, inter alia of the ONERA type, characterized in that its constituent metal fibres are converted into an alloy containing chromium and possibly at least one additional migratory metal;

a thin sheet of refractory metal felt, preferably having tubular fibres, inter alia of the ONERA type, which has received an addition of chromium and possibly an addition of at least one additional migratory metal, characterized in that the sheet has been given after such addition a selective oxidation treatment to produce a refractory metal oxide film;

a thin element of such a refractory metal felt, characterized in that it has been so pre-shaped as to be adapted to engage intimately with at least some of the external surface of an article for treatment;

a thin element of such a pre-shaped refractory metal felt, characterized in that it contains in alloy form at least chromium and possibly at least one additional migratory metal;

a thin element of a refractory metal felt of the kind described which has been pre-shaped and processed by an addition of chromium and possibly by an addition of at least one migratory metal, characterized in that its constituent metal fibres are covered by a refractory metal oxide film;

a thin element of a refractory metal felt of such a kind which has been pre-shaped and processed by selective oxidation, characterized in that the element consists of two half-shells adapted when juxtaposed to form a sheath for the article to be treated;

addition metal elements having an aluminium core embedded in a refractory metal sheath, such elements being adapted to carry into effect the ninth supplementary feature of the invention, and metal articles, particularly refractory metal articles, characterized in that they have been treated by a process and through the agency of a special system according to the invention, such articles possibly being inter alia turbine blades, more particularly hollow perforate blades.

To give a better idea of the various features hereinbefore mentioned, a description will now be given of some examples of possible but non-limitative embodiments of the invention, reference being made to the accompanying drawings wherein.

Figure 3:
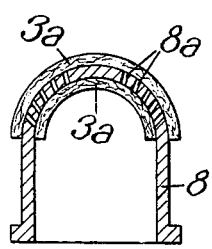
Figure 4:
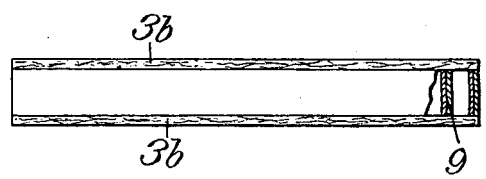

FIG. 3 is a sectioned view of a perforate heavy-fuel injector which has special felt elements according to the invention so that it may be treated by a powder diffusion process, and FIG. 4 is a view of elevation, with parts removed, of a fuel cell element embodied by spirally wound flat and wavy metal sheets, the element having felt pellets or the like so that it may be treated by a process according to the invention.

EXAMPLE 1 — (FIG. 1)

The article being treated is an air-cooled moving blade 1 of a turbo-jet engine. The article is hollow and its wall, of a thickness of approximately 1 mm, is pierced with a large number of apertures 2 measuring 240 microns in diameter. The article is made of "IN 100" refractory alloy (nickel base chromium 10; cobalt 15; molybdenum 3; titanium 5; aluminium 5; vanadium 1; carbon 0.18). It is required to form protective sheaths of even thickness on the external surface of the article and on the walls of the cooling passages or apertures 2, the treatment being required not only to protect the articles against corrosion but also to provide an appreciable and regular reduction in the diameter of the deliberately oversized passages 2.

According to the invention, the perforate region of the blade 1 is protected by means of a sheath consisting of two half-shells 3 of processed ONERA felt, while the air inlet orifices near the blade root are protected by two flat pellets of the same material. The starting sheet of ONERA felt is a nickel felt sheet which is 0.7 mm thick (and which has an open porosity of 94%), consisting of tubular metal fibres of from 10 to 20 microns in diameter. Two pieces are cut from the sheet and are pre-shaped so as to be adapted to make intimate contact with the corresponding surfaces of the perforate region of the blade in accordance with the two half-shells 3 forming the sheath. The two flat pellets for the air inlet orifices are also cut from the sheet.

The resulting nickel felt elements are then converted into 60-40 nickel-chromium felt elements. To this end, the elements are immersed in a reactive composition consisting of:

| | |
|---|---|
| finely powdered alumina finely powdered (1 to 20 μ) | 50% by weight |
| 35-65 nickel-chromium | 50% by weight |

The ingredients are mixed intimately and have added to them 0.25% of ammonium chloride and 0.25% of ammonium bromide. The complete system is heated in a semi-hermetic metal chamber or box or the like in an oven with a hydrogen atmosphere at 1030° C for 5 hours, whereafter the felt elements are removed from the box, then carefully washed first in dilute nitric acid and then in distilled water.

The selective oxidation treatment is given by heating at 750° C for 2 hours in wet hydrogen prepared by bubbling hydrogen through water at 35° C. A chromium oxide content of 10% by weight of the felt is produced. The inside surface of the two half-shells is coated with a coating of aluminium paint whose resin consists of methylpolymethacrylate diluted with cyclohexanone. The coating is very thin and corresponds to 2 mg of Al/cm$^2$ of exposed surface area of the felt.

The two half-shells 3 are used to form a sheath around the blade other than in the root part, a slight beading 3a being made. The two flat pellet-like parts are secured in their positions by means of a solution of methylpolymethacrylate in cyclohexanone. The cyclohexanone evaporates completely after stoving at 150° C for 2 hours.

The blade 1 with its sheath 3 and its pellets is embedded in a reactive substance 4 contained in a partially gas tight box 5 which is placed in an oven 6 through which there is a flow of hydrogen. The composition of the substance 4 is the conventional magnesium chrome aluminization composition disclosed by the French patent previously mentioned. The thermochemical diffusion treatment is given at 1070° C for 15 hours. After the treatment the blade 1 is removed from the composition 4 and the sheath 3 and pellets are removed from the blade 1. The blade part which has been protected by the sheath 3 has a bluish smooth and lustrous appearance both on its outside surfaces and on the inside walls of the passages 2. The thickness of the layer is 70 microns and is the same as on the sheathed outside surfaces and on the unsheathed surfaces such as the blade root which was in direct contact with the composition 4. The thickness and structure of the layer on the inside wall of the passages 2 are substantially as for those of the outside layers. Aperture diameter is reduced to 180 microns.

A blade which has been given the foregoing treatment and which is cut for checking also has in its hollow interior a chrome aluminized coating of a bluish, smooth and lustrous appearance with a thickness of from 10 to 20 microns, even in the zones furthest away from the blade outside surface.

The behaviour in simulated testing of articles treated by the process according to the invention was very satisfactory, cooling of the articles remaining constant until the end of the test because of the protection provided on the surfaces of the cooling orifices and of the resulting absence of any salt deposit.

EXAMPLE 2

The article treated is a perforate turbo-jet blade having a wall thickness of 1.8 mm with passages of a diameter of 400 microns. The material of which the article is made is X 40 refractory alloy (cobalt base, Cr 25, Ni 10; W 7.5; Fe 1.5; C 0.5).

The treatment to be given is chromaluminization on a previous nickel-boron coating. The starting ONERA felt used is a 1 mm thick cobalt felt sheet whose open porosity is 94% and which consists of metal fibres of from 10 to 20 μ in diameter. The subsequent procedure is as in Example 1 except that the reactive composition for converting the cobalt felt elements into a 65-35 cobalt-chromium felt contains instead of finely-powdered nickel-chromium alloy a finely-powdered 40-60 cobalt-chromium alloy.

Selective oxidation, coating with aluminium paint and stoving are carried out as in Example 1.

The blade with its sheath and pellets is given chromaluminizing treatment at 1090° C for 20 hours. Upon removal of its sheath the blade has a very smooth semi-lustrous surface texture of a greyish-beige colour. Layer thickness is 80 microns and the diameter of the apertures is reduced to 320 microns.

EXAMPLE 3

The treated article is a moving blade of a turbo-jet engine similar to the blade of Example 1 except that the refractory alloy is B 1900 (Ni base; Cr 8, cobalt 10, Mo 6, Ta 4.3, Ti 1, Al 6, C 0.11).

It is required to devise protective sheaths whose thicknesses are uniform but vary according as they are associated with the external zones of the articles or the zones corresponding to the inside of the cooling passages — i.e., 100 and 30 microns respectively. The latter zones experience less severe temperature and corrosion stresses than the external zones.

Blades which are imperforate to start with are given a chromaluminizing protection treatment at 1085° C for 18 hours, leading to the formation of a chromaluminized sheathing 100 μ thick. After treatment the articles are cleaned by wet sanding, then pierced with cooling apertures 280 microns in diameter.

The articles are then treated in accordance with Example 1 except that the final treatment conditions for sheathing the inside of the passages are a duration of 8 hours at 1030° C.

The end products have a bluish, smooth and lustrous surface appearance and are sheathed by diffused coatings whose thickness is within 100/110 microns on the outside surfaces and 30 microns on all the surfaces corresponding to the cooling passages; the end diameter of the cooling passages was slightly reduced to 250 microns.

EXAMPLE 4

The workpiece and the requirements are exactly as for Example 3 but the initial 100 μ thick pre-piercing coating is produced physically and consists of a complex Ni, Cr, Al, Si and Y alloy.

To prevent any reaction between the initial coating and the felts, the latter must contain aluminium as well as chromium. The required felt composition is Ni, Cr, Al in the proportion of 65-25-10.

The same procedure is followed as in Example 1 except that the thermochemical chromium incorporation treatment is carried out at 1030° C for 4 hours. The felt composition is then 65-35 Ni-Cr.

The aluminium incorporation step consists of a second thermochemical treatment using a reactive composition consisting of 50% of finely powdered aluminium and 50% of a finely powdered (1 to 20μ) alloy of 65-23-12 Ni-Cr-Al. The ingredients are mixed intimately and the mixture has added to it 0.25% of $NH_4Cl$ and 0.25% of $NH_4Br$. The treatment conditions are 5 hours at 1030° C.

The felt elements are given washing and selective oxidation treatment in accordance with Example 1. The oxide layer contains in this case an appreciable proportion of $Al_2O_3$ as well as of $Cr_2O_3$. The articles are then treated in accordance with Example 3 and at the end of such treatment have the same characteristics.

EXAMPLE 5

The treated article is a composite fixed blade in which the actual blade portion consists of an assembly of TD nickel sheets pierced with a number of 450μ diameter apertures, the root or base consisting of Hastelloy X. The compositions of these materials are as follows:

TD Nickel: nickel containing 2.5% of $ThO_2$ in the form of a very fine dispersion.

Hastelloy X: nickel base, Cr 22, cobalt 1.5, Mo 9, Fe 18.5, C 0.1.

The assembly of the TD nickel parts to the Hastelloy X parts of the articles was by vacuum brazing in known conditions.

It is required to form thick protective sheaths on the blade and very thin protective sheaths on the root or base. The two half-shells forming the sheath for the blade are prepared as in Example 1 — i.e., retaining maximum porosity. At the root, however, the corresponding two half-shells are brought to maximum density by compression before processing. Selective oxidation treatment is given in wet $H_2$ at 750° C for 3 h. The $Cr_2O_3$ content is 13%.

The protective treatment for the article is given in two phase or steps. The first step consists of chromizing using a reactive composition containing 50% of powdered $Al_2O_3$ and 50% of finely powdered (1 to 20μ) 80-20 Ni-Cr alloy. 0.5% $NH_4Cl$ and a few flakes of yttrium are added to the reaction composition. The treatment conditions are 20 hours at 1180° C. The second phase or step is chromaluminizing at 1050° C for 8 hours, after replacement of the first sheaths by new and identically prepared sheaths. The end products are ductile protective sheaths on an aluminium-chromium-nickel base and having a thickness on the blade portion of the order of 300 microns, which corresponds in the special case of TD nickel to apertures having a final diameter of 175μ.

The base has a similar but much thinner sheath.

EXAMPLE 6 (FIG. 2)

The treated article is a moving blade 7 which is made of "IN 100" and which is convection cooled — i.e., it is hollow but imperforate.

Figure 1:
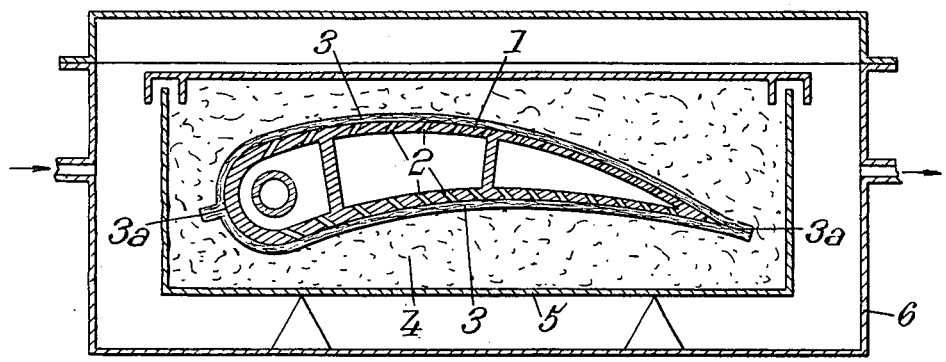
FIG. 1 is a sectioned view through a hollow perforate turbine blade having a refractory metal felt sheath according to the invention, the blade being shown in position for powder diffusion treatment in a semi-hermetic box received in a furnace.
Figure 2:
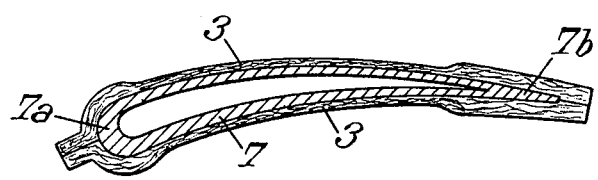
FIG. 2 is another sectioned view through a hollow turbine blade which has a sheath according to the invention of a kind such that diffusion layers of varying thickness can be produced on the blade.

It is required to form a protective sheathing which is thicker at the leading edges 7a and trailing edges 7b than over the rest of the blade so as to minimize in the latter region the effect of the diffusion layer on creep strength. The procedure is as in Example 1 except that the half-shells 3 are shaped by means of a shaping tool which, as can be seen in FIG. 2, squeezes or compresses the central part. The post-treatment porosities of the shells are 85% in the parts associated with the leading and trailing edges and 35% in the parts associated with the top and bottom of the blade.

After the chromaluminizing, protection treatment has been given at 1070° C for 15 hours, the thickness of the resulting sheaths in zones corresponding to unsqueezed parts of the shells is 70 microns, as compared with a thickness of only 55 microns in the sheaths corresponding to the compacted or squeezed portions of the shells. The sheath thickness on the internal surfaces of the article is about 30 microns.

EXAMPLE 7 (FIG. 3)

The article to be treated is a heavy-fuel injector 8 and is made of a 55-25-20 refractory steel consisting of iron, chromium and nickel. It has injection orifices 8a which are 600 microns in diameter.

It is required to provide corrosion protection at a moderate temperature, of approximately 750° C, of the material in respect of sulphur and vanadium, both of which are very aggressive at temperatures in this region, and to produce a controlled reduction of the initial diameter of the injection orifices 8a which cannot be achieved directly with the required fineness when the articles are produced by precision investment casting.

Felt elements 3a are prepared in accordance with Example 1. The article, with its two felt elements (FIG. 3) on it, is immersed in a reactive chromizing composition containing 50% finely powdered alumina and 50% finely powdered (1 to 10μ) chromium. 0.25% $NH_4Cl$ and 0.25% $NH_5F_2$ and flakes of yttrium or of a lanthanide are added to the reaction composition. The treatment conditions are 20 hours at 1100° C.

After treatment the articles are sheathed in layers of diffusion chromium alloy approximately 230 microns thick, providing effective protection against sulphur and vanadium and reducing the initial orifice diameter to values of from 300 to 325 microns because of the regular overthickness provided by the chromizing treatment and corresponding to approximately 60% of the actual thickness of the chromium diffusion layer.

EXAMPLE 8—(FIG. 4)

The workpiece is a fuel-cell element 9 consisting of a winding of flat thin metal sheet and of a wavy thin metal sheet (0.2 mm) each consisting of an 80-20 nickel-chromium alloy. The amplitude of the undulations or corrugations or the like is approximately 300 microns. The width is 5 mm and the winding is continued up to a diameter of 140 mm.

It is required to form a protective sheath against chemical corrosion by hydrogen peroxide and hydrazine.

The felts 3b are prepared in accordance with Example 1 except that no shaping step nor aluminium-painting step is required.

The thermochemical protective treatment chosen is tantalization and is performed in a reaction composition consisting of 50% finely powdered alumina and 50% finely powdered (1 to 20μ) 20-18-62 Ni-Cr-Ta alloy. 0.5% $NH_4Cl$ and 0.5% aluminium powder are added to the reaction composition The function of the aluminium powder is to reduce chromium oxide formed by selective oxidation of the felt. The treatment conditions are 10 hours at 1080° C.

The end products are diffused tantalum sheaths which contain a reduced proportion of chromium and which have a lustrous appearance, are ductile and have an even thickness of approximately 50 microns. No cement particle was observed in the corrugations, the particular thermochemical conversion treatment which was used leading, however, to some thermochemical welding of the corrugations on the intermediate nickel-chromium alloy sheet — which is an advantage in the particular case concerned.

EXAMPLE 9

The treated article is an afterburning ramp of a turbo-jet engine and consists of a "Hastelloy X" tube of 8 mm internal diameter and 11 mm external diameter. The tube, curved into a collar-like shape of 650 mm diameter, is pierced with a large number of kerosene (paraffin) injection orifices each 400 microns in diameter.

It is required to provide a high-aluminium-content sheath for protecting the ramp against soiling by coking of kerosene (paraffin) during periods when afterburning is inoperative.

Felt pellets or the like are prepared in accordance with Example 1 and secured to the passages by means of an 80-20 nickel-chromium wire. A small quantity of $NH_4Cl$ and $NH_5F_2$ is introduced through the kerosene supply duct.

The treatment given is chromaluminization, performed at 1060° C for 12 hours.

The treatment leads to sheaths which are about 65 microns thick on the outside surfaces of the articles; the initial 400 microns diameter of the cooling orifices is reduced to approximately 340 microns. Even the inside of the articles was found to be coated with a chromaluminized sheathing at least 10 microns thick in the regions furthest away from the ejection orifices.

If it is required to increase the latter thickness, a braid consisting of three 0.6 mm dia. aluminium wires which has been chromium-coated, e.g. by a thin electrolytic deposit, is placed inside the ramp before treatment. Diffusion layer thickness is then from 70 to 80$\mu$ both inside the ramp and in the apertures and on the outside surface. The braid-forming metals are completely consumed during treatment.

To illustrate more particularly the ninth supplementary feature of the invention as hereinbefore set forth, some more detailed examples will now be given of how the ninth feature can be used in the initial step (short low-temperature pack-process treatment) of conventional high-activity pack processes known to skilled addressees. One such process is American and is described in French Pat. Nos. 2,021,543 and 2,030,314 (a process developed by Pratt and Whitney). The other process is a French one and was developed by the same assignees as the instant invention.

The American process is a silicon-doped aluminization process. The articles are heated at from 700° to 800° C for 2 hours in a reaction composition mainly consisting of an aluminium-silicon alloy powder having 12 or 13% silicon content, with an addition of alumina and a little ammonium chloride, the latter serving as halogenated carrier. This initial treatment step leads to the formation of diffusion layers consisting mainly of an aluminide of nickel ($Ni_2Al_3$) or of cobalt (depending on the nature of the substrate) with an addition of a little silicon. After removal of the articles from the reaction composition, the articles are given the post-diffusion treatment.

The French high-activity process is mainly a chromium-doped aluminization treatment in which the initial step consists of heating the articles at about 820° C for from 3 to 4 hours in a reaction composition mainly consisting of a 40-60 Cr-Al alloy in ultrafine powder form, with an addition of alumina and of ammonium chloride.

The initial step is followed by a post-diffusion treatment as in the previous case.

EXAMPLE 10

The treated article is a convection-cooled moving blade of a turbo-jet engine. The blade is hollow and its interior is divided into three parallel longitudinal chambers which open on to the top of the blade (peripheral end) and which are supplied with cooling air through channels in the blade root, the blade being made of "B 1900" refractory alloy having the following composition:

Ni base, Cr 8, Co 10, Mo 6, Ta 4.3, Ti 1, Al 6, C 0.11

It is required to form protective sheets of even thickness on the blade outside surface and on the wall of its interior space.

According to the invention, a number of strips are placed in each chamber, the strips consisting of 20 microns thick aluminium foil or sheet coated with 0.5 micron of chromium (Al/Cr proportion by weight: 7.7) and measuring 3 mm × 80 mm. They weigh 8 mg/cm$^2$ of internal area of the articles to be treated. A small amount of a mixture of ammonium chloride and ammonium fluoride in powder form containing 85% by weight of ammonium chloride is added. The open regions of the blade chambers are protected by means of a piece of processed ONERA felt. The ONERA felt sheet used as starting material is a nickel felt sheet 0.4 mm thick which has an open porosity of 85% and which consists of tubular metal fibres of from 10 to 20 microns in diameter. The sheet is cut into two flat pieces which are engaged intimately with the corresponding surfaces of the open zones of the blade. The resulting system of nickel felt elements is then converted into a 48-30-22 Ni-Cr-Al felt, to which end the elements are immersed in a reaction composition consisting of 50% by weight of finely powdered aluminium and 50% by weight of finely powdered (1 to 20 microns) 35-65 Ni-Cr alloy. An intimate mixture is prepared and has added to it 0.25% ammonium chloride and 0.25% ammonium bromide. The whole is heated in a partly gas-tight metal box in an oven in a hydrogen atmosphere at 1030° C for 5 hours, whereafter the composition of the felt is 60-40 Ni-Cr.

The aluminium is incorporated by means of a second thermochemical treatment using a reaction composition consisting 50% of finely powdered alumina and 50% finely powdered (1 to 20 microns) 50-25-25 Ni-Cr-Al alloy. An intimate mixture is prepared and has added to it 0.25% ammonium chloride and 0.25% ammonium bromide.

The treatment conditions are 5 hours at 1030° C.

The felt elements are then removed from the box, then carefully washed first in dilute nitric acid and then in distilled water.

The selective oxidation treatment consists of heating at 750° C for 2 hours in wet hydrogen prepared by bubbling hydrogen through water at 35° C. A total oxide content corresponding to 10% by weight of the felt is obtained. The oxide layer contains an appreciable proportion of alumina in addition to chromium oxide.

The internal surface of the two flat pellets is then given a coat of aluminium or aluminium-silicon paint whose glaze has a collodion base which pyrolyzes without carbon residue. The coat is very thin and corresponds to 2 mg of Al/cm$^2$ of visible felt surface area.

The two pellets are fixed in position by means of a solution of methyl polymethacrylate in cyclohexanone. The cyclohexanone evaporates completely after 2 hours stoving at 150° C.

The blade with its pellets is embedded in a reaction composition in a partly gas-tight box which is placed in an oven flowed through by hydrogen. The reaction composition consists of 30% of aluminium-silicon alloy powder with a 13% silicon content and 70% of finely powdered alumina. The thermochemical Al-Si addition treatment is given from 750° to 780° C for 1 hour.

After treatment the blade is removed from the reaction composition, the pellets are removed from the blade and the same is washed in running water. The outside part of the blade has a light-grey appearance.

The post-diffusion thermochemical treatment is given in a hydrogen atmosphere at 1080° C for 7 hours. The thickness of the resulting layer is 80 microns on the external surfaces.

A blade which has been given such a treatment, and then cut open to be checked, also has a lustrous bluish-grey coating in its internal chambers, of a thickness from 65 to 70 microns. The outside layer of the article is found to consist of a nickel aluminide containing a little silicon, while the internal layer consists of a nickel aluminide containing a little chromium and completely devoid of porosity or parastic inclusion or crack.

Associating two kinds of sheathing on articles helps to give excellent protection for all the surfaces of such articles both against oxidation in the presence of cyclic temperature variations and also on sulphuration behaviour tests.

Because of the nature and composition of the sheath protecting the internal surfaces of the articles, no surface micropeeling or microchipping is observed in prolonged high-temperature oxidation behaviour tests, the oxidized surfaces still having a uniform light-grey colour after several hundreds of hours at 1100° C.

EXAMPLE 11

This Example differs from Example 10 only in that the weight of the chromium-coated aluminium strips placed in each of the chambers in the treated blade corresponds to 5 mg/cm$^2$ of blade internal surface. The blade thus treated has an even sheath over its inside and outside surfaces; in this particular example the thickness of the internal sheath is reduced to about from 45 to 50 microns.

EXAMPLE 12

This Example differs from Example 1 only in that the weight of the chromium-coated aluminium strips placed in the central internal chamber (which is less exposed to corrosion than the adjacent end chambers) is only 4.5 mg/cm$^2$, whereas the weight of the strips disposed in the end chambers adjacent the central chamber is 8 mg/cm$^2$ as in Example 1.

It was found after treatment that the thickness of the resulting sheaths is from 65 to 70 microns in the end chambers and only from 35 to 40 microns in the central chamber.

EXAMPLE 13

This Example is similar to Example 1 except that the blade root is protected by being coated with a known ceramic paste based on alkaline-earth oxides. The qualities and thicknesses of the external and internal sheaths produced by the treatment are substantially as in Example 1, but the blade root is substantially devoid of sheath.

EXAMPLE 14

The treated article is a hollow mobile turbo-jet engine blade cooled by convection, film and impact. The blade is made of "IN 100" alloy having the following composition:

Ni base, Cr 10, Co 15, Mo 5, Ti 5, Al 5, Va 1, C 0.18.

Before being pierced, the blade outside surface is given a preliminary protective treatment involving the formation by physical treatment (ion-platinum) of an approximately 100 micron thick coating consisting of a cobalt-chromium-aluminium-yttrium alloy. The blade side walls are then pierced with 250 micron diameter apertures.

It is required to form protective sheaths on the inner walls and in the apertures of the blade.

Aluminium strips 15 microns thick, having on one of their surfaces a 0.6 micron thick chromium layer, the total weight of the strips being 6 mg/cm$^2$ of internal surface to be treated, are placed in the hollow interior of the blade, whereafter a small refractory alloy cap is fitted to the end of the blade. The cap is then fixed by electron bombardment. The blade thus treated is covered externally in its perforate portions by a 0.3 mm thick converted ONERA felt sheath consisting of Ni-Cr-Al alloy fibres containing 30% of chromium and 30% of aluminium. The blade is then placed in direct contact with an aluminizing reaction composition containing a powdered refractory diluent and an yttrium-doped alloy of chromium and aluminium in ultrafine powder form, the aluminium and chromium being present in equal weights, a little (0.5% by weight) ammonium chloride being added.

The heat treatment is then given in a partly gas-tight box placed in an oven flowed through by hydrogen, at 880° C for approximately 6 hours. Upon the completion of the heat treatment the inside and outside surfaces of the blade have a smooth bluish-grey appearance.

A supplementary post-diffusion treatment is then given at 1080° C for 8 hours, the blade being cooled rapidly at the end of the treatment.

The blade thus treated has continuous even sheaths which have a light-grey appearance and which are about 70 microns thick on the outside surface and from 45 to 50 microns thick on the inside surfaces. The thickness of the sheathing in the apertures varies from 50 to 70 microns from the inside end to the outside end of each aperture, the average diameter of the apertures being reduced to approximately 200 microns.

EXAMPLE 15

The treated article is an afterburning ramp for a turbo-jet engine, the ramp being made of "C 263" refractory alloy having the following composition:

Ni base, Cr 20, Co 20, Mo 6, Ti 2, Al 0.4, C 0.06.

The ramp, in the form of a tubular collar, has in cross-section an internal diameter of 8 mm and an external diameter of 11 mm and is formed on its periphery every 80 mm with 0.6 mm diameter kerosene ejection orifices.

It is required to form protective sheaths inside and outside the ramp and on the walls of the ejection orifices.

First, the same are masked at their external end by thin (0.4 mm thick) pellets of converted 45-30-25 Ni-Cr-Al ONERA felt having an open porosity of 80%. The ramp is provided with a number of braids each consisting of three 0.2 mm diameter aluminium wires coated with a thin layer of chromium (aluminium-chromium ratio of 8). The braids weight 5 mg/cm$^2$ of internal surface area of the ramp.

The ramp thus prepared is treated in the same conditions as in Example 5.

After the final post-diffusion operation the end product is a ramp which is sheathed externally and internally with continuous and very clean sheaths which are about 70 microns thick on the outside surface and from 35 to 40 microns thick on the inside surface. The inside of the ramp is free from any solid or powdery residue and the diameter of the ejection orifices (which are sheathed to a thickness of approximately 50 microns) is reduced to about 500 microns.

EXAMPLE 16

The treated articles are fixed hollow blades for turbo-jet engines and cooled by simple convection — i.e., their walls are imperforate. The blades are assembled articles formed by brazing together two half-shells made of an Ni-Cr matrix alloy and an oriented strengthening phase of niobium carbide fibres.

The total composition by weight % of the alloy is:

Ni base, Cr 10, niobium 7.7, C 0.8.

Nickel and boron are first deposited chemically (except for the blade root) in a thickness of 20 microns on the blade outer wall, whereafter the boron is removed and a heat-treatment pre-diffusion is given by heating the blades in an equilibrium-fluorinated reducing atmosphere at 1050° C for 6 hours. The ends of the hollow interior of the blade are then closed by filter pellets consisting of thin ONERA felt and prepared as in Example 1 after 15 micron thick aluminium strips coated with a 1 micron thick layer of chromium have been placed in the blade, the weight of the strips being 7 mg/cm$^2$ of the blade internal surface.

A thermochemical treatment in accordance with Example 5 is then given.

The resulting diffusion layers are even and are from 65 to 70 microns thick on the blade outside surface and 40 microns thick on its inside surface.

Clearly, and as the foregoing shows, the invention is not limited to those of its uses and embodiment which have been more particularly considered but covers all the variants, including those in which the starting refractory metal felt from which the filter elements are cut is not an ONERA felt but an equivalent porous refractory substance. As such an equivalent substance there may be mentioned inter alia the substance disclosed by French Pat. Nos. 1,396,856 and 1,396,857 wherein the porous metal product is prepared by first making a chemical deposition of a metal, e.g. silver or copper, on a porous destructible support, whereafter the same is eliminated by burning. Advantageously, the temporary support is in the form of a fibrous substance having entangled fibres and consists e.g. of coal or cotton or cellulose or the like. The metal product which preserved the structure of the removed support can, according to the first of the two patents just mentioned, be devised from nickel, cobalt, iron, copper, silver, etc.

What we claim is:

1. In a thermochemical process for the formation of surface diffusion alloy layers on refractory metallic articles having perforations therein whose transverse cross-sectional dimension is less than 0.4 mm, said process comprising submerging the treated articles in a reagent containing a mixture of a first powder of metal or alloy for supplying at least one metal to the treated articles, and a second powder of an inert diluent, said first and second powders having a particle size ranging between 1 and 50 microns, and thereafter subjecting the reagent and the article to a thermal treatment in a halogen-hydrogen atmosphere at a temperature between 750° and 1200° C, the improvement wherein prior to submerging the metallic article to be treated in the said reagent, the said article is individually covered, on at least the part of the external surface thereof having said perforations therein, with a metallic felt coated with a film of stable refractory oxide, said metallic felt being previously cut into a thin sheet of a thickness of a few tenths of a millimeter to a few millimeters, and pre-shaped so that one of the faces thereof adapts itself closely to the external surface of the article to be treated, the other face of the said metallic felt sheet being in intimate contact with the reagent when the article and the metallic felt sheet associated therewith is submerged in the said reagent, the said metallic felt sheet coated with a film of stable refractory oxide being obtained from a sheet of a refractory metallic felt, having a thickness of 0.3 to 1 mm., containing chromium in proportion by weight between 10% to 60% and having been subjected to selective oxidation to produce chromium oxide, said film of stable refractory oxide being produced by action of a reducer of the chromium oxide, and said selective oxidation being effected so that the fibers constituting the metallic felt sheet are covered with a layer of chromium oxide that represents at least 5% of the weight of the metallic felt sheet.

2. A process as claimed in claim 1, wherein the reducing element is included in a reactive composition used for the pretreatment of the sheet used for the fibers.

3. A process as claimed in claim 1, characterized in that the reducing element is added in the form of a layer disposed on at least that surface of the metallic felt sheet which is in contact with the article.

4. A process as claimed in claim 1, characterized in that the reducing element is added by the fibers of the metallic felt sheet being given a vacuum vapour coating treatment with the reducing element.

5. A process as claimed in claim 1, for the treatment of an article containing, at least in the surface layer thereof, in an appreciable proportion of greater than 5 weight percent, a migratory metal selected from the group consisting of aluminum, yttrium, titanium, lanthanides, tantalum, iron and colbalt, in which, in addition to chromium, at least one metal of said group is previously incorporated as an alloy in the metallic felt sheet subsequently applied to the article to be treated.

6. A process as claimed in claim 1, characterized in that said metallic felt constitutes a sheath providing at least partial sheathing of the treated article, the sheath preferably being formed by two individually preformed half-shells which are juxtaposed on the article with their adjacent edges rigidly interconnected, said edges being overlapping the contour of the article as to facilitate the interconnection thereof.

7. A process as claimed in claim 1 wherein to vary the thickness of the diffusion layers produced on the treated article at the end of the thermochemical diffusion treatment, when a preformed and converted metallic felt sheet is fitted to the workpiece to be treated, local compressions of varying intensities are produced in the metallic felt by plastic deformation, whereby the porosity of different areas of the metallic felt sheet is decreased in proportion to the amount they have been compressed.

8. A process as claimed in claim 1, wherein, for selective oxidation of a refractory metallic felt sheet which has already received an addition of chromium in alloy form and at least one other migratory metal, the metallic felt is heated in a wet hydrogen atmosphere at a temperature of from 700° to 900° C for a time of from a few hours to a few minutes, the wet hydrogen atmosphere being produced by flowing hydrogen being bubbled through water at approximately 30° C.

9. A process as claimed in claim 1, for the treatment of a perforate article for which the diffusion layers on the perforated walls are required to be thinner than the diffusion layers on the outer wall of the article, wherein, prior to the holes having been provided in the article and prior to the diffusion treatment, the article is treated to produce a diffusion layer on the outer wall of the article, whereafter holes are formed in the article and the article is diffusion treated.

10. A process as claimed in claim 1, for the treatment of hollow perforated articles in order to form a superficial diffusion alloy on the internal wall of said articles, wherein the reagent powders include aluminum, and the thermochemical diffusion treatment comprises the initial operation of a high-activity powder process, and thereby conducted at a relatively low temperature between about 750° and 850° C during a relatively short period from a few minutes to one hour, said process further comprising disposing a predetermined amount of metallic addition elements in the internal cavity of the article to be treated, before said articles are subjected to the brief low temperature thermal treatment, said metallic elements comprising a core of aluminum coated with a sheath of at least one metal selected from the group consisting of chromium, iron and manganese, the thickness of said sheath being less than about 10 microns and said sheath being deposited on the aluminum core, said predetermined amount being such that the metallic addition elements will be entirely consumed at the end of the thermochemical treatment.

11. A process as claimed in claim 1, characterized by the metallic fibers comprising said metallic felt sheet being converted to an alloy that contains chromium in a proportion by weight between 10 and 60%, said fibers being coated by a stable refractory metallic oxide film produced by a process of selective oxidation performed on said sheet subsequent to the sheet receiving chromium.

12. A process as claimed in claim 11, characterized in that the chromium deposit on the metallic fibers is between 25 and 50% by weight.

13. A process as claimed in claim 11, characterized in that the metallic fibers of the metallic felt sheet include, in addition to chromium, at least one supplementary metal that is migratory by nature.

14. A process as claimed in claim 11, wherein said metallic felt sheet is formed by two half shells which, when juxtaposed, constitute a sleeve that sheathes at least the perforated portion of the article to be treated.

* * * * *